(No Model.)

D. W. BOVEE.
Hay Raker and Loader.

No. 231,391.          Patented Aug. 24, 1880.

Witnesses:

Inventor:
D. W. Bovee,
per
F. A. Lehmann,
Atty

UNITED STATES PATENT OFFICE.

DAVID W. BOVEE, OF RICHLAND CENTRE, WISCONSIN.

HAY RAKER AND LOADER.

SPECIFICATION forming part of Letters Patent No. 231,391, dated August 24, 1880.

Application filed April 21, 1880. (No model.)

*To all whom it may concern:*

Be it known that I, DAVID W. BOVEE, of Richland Centre, in the county of Richland and State of Wisconsin, have invented certain new and useful Improvements in Hay and Grain Rakers and Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes and elevators; and it consists in pivoting each one of the slats or cross-bars which form the elevating-rake in suitable boxes or bearings, which are attached to the endless aprons, and slotting these boxes so that the pin or projection extending outward from the end of the slat, and which projects through the slot, shall form a stop to regulate the distance that the slats shall turn in their bearings or journals as they pass down over the upper rollers.

It further consists in attaching to each one of the rake-slats or cross-bars a brace or support which projects backward from the bar, and, resting upon suitable bearings or guides placed inside of the frame, prevents the slats from turning backward in their bearings until they have passed the guides, which extend up to the top rollers of the frame, as will be more fully described hereinafter.

The object of my invention is to so construct or arrange each slat of the rake that as they pass down over the upper end of the frame, should they be caught in the hay, they can turn backward so as to liberate the teeth without forcing or drawing some of the hay downward, as is the case where the slats are rigidly secured to the endless bands.

Figure 1:
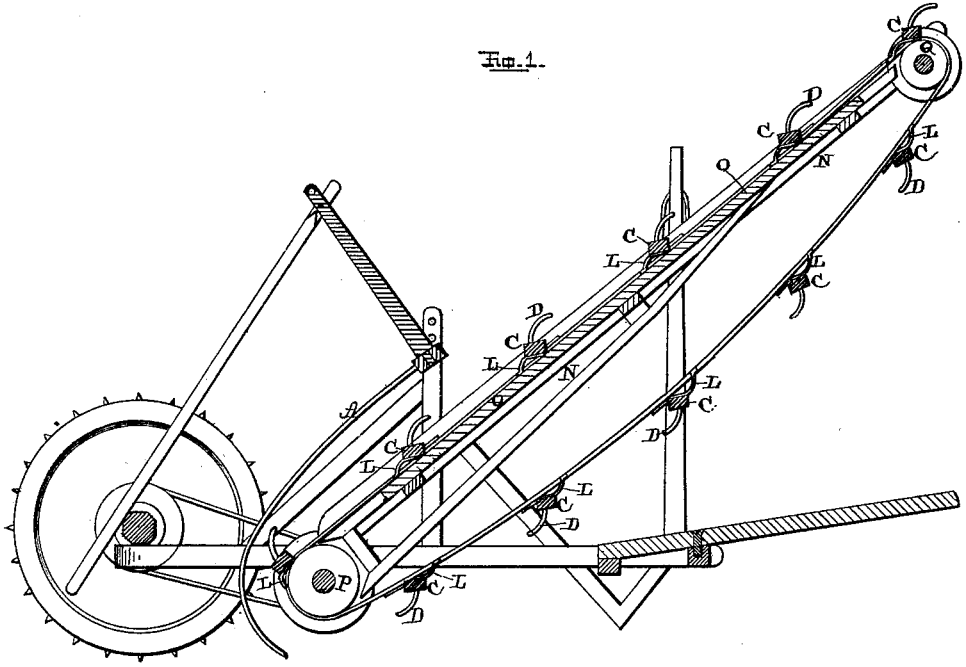
Figure 2:
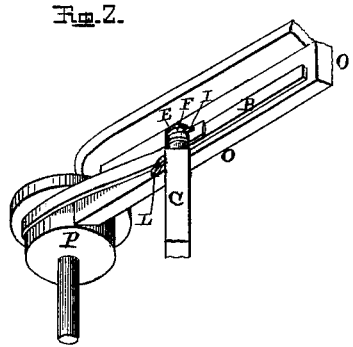

Figure 1 is a vertical section of a machine embodying my invention. Fig. 2 is an enlarged plan view of one end of one of the rake bars or slats.

This invention is intended as an improvement upon the patent granted to me October 22, 1878, and numbered 209,156, and as the frame, driving-wheels, and method of raising and lowering the elevator-frame are substantially the same as shown and described in that patent, it is thought unnecessary to more fully describe them here, with the exception that the rake-teeth A are pivoted at a much higher point over the top of the elevator-frame, so that they will more readily pass over obstructions that may be in the way.

The elevating-rake consists of two or more endless bands or straps, B, and the slats or bars C, provided with the teeth D. Each end of these slats or bars are journaled in suitable bearings or boxes E, which are secured to the endless aprons, and in which the slats or bars can turn partially around. These boxes may be formed of any suitable material, and each one of them has a slot, F, cut through its top. Projecting through each one of these slots is a pin or stop, I, which extends out from the end of the bar or slat, and which pin or stop, by catching against the ends of the slots F, regulate the distance which the slat can be turned.

Secured to each one of the slats or bars, on its under side, is a brace, L, which serves to prevent the bar or slat from turning backward in its bearings while the slat or bar is moving upward over the elevator-frame. Inside of the frame N there is placed a suitable guide or way, O, upon which this brace bears for the purpose of holding the slat in position. One of these braces will be sufficient to hold each slat in place, though two may be used, and in each case there will be a guide placed, as here shown, inside of each side of the frame. These guides extend from slightly above the top of the lower pulleys, up a short distance over the top of the upper pulleys, and thus hold the slats in position during the whole time that they are traveling upward over the top of the elevator-frame. The lower pulleys, P, are made considerably wider than usual, so as to form a special bearing for this brace as soon as the slats rise upward over their sides, and thus the slats are braced in position from the moment the slats are brought into play in elevating the hay upon the elevator-frame. The upper pulleys, Q, are not made any wider than usual, so that as soon as these braces have passed beyond the upper ends of the guides the teeth of the slat can turn freely backward, so as to disengage themselves from the hay before they begin to descend.

Where the slats are secured rigidly to the endless bands or belts the teeth generally become more or less entangled in the hay that is being carried upward, and then as the teeth turn downward after passing over the tops of the upper pulleys they carry down with them considerable quantities of the hay, and which has only to be carried up again.

The object of this invention is to allow each rake bar or slat to turn automatically in its bearings, so that the teeth can disengage themselves from the hay before they begin their downward passage.

Having thus described my invention, I claim—

1. The combination of the endless bands or belts, the rake slats or bars, and suitable boxes or bearings secured to the endless belts or bands for the rake slats or bars to turn in, the said boxes being provided with slots through which the stops or pins extending out from the ends of the slats pass, and thus regulate the distance which the slats shall turn backward, substantially as described.

2. The combination of an elevator-frame provided with the guide or guides O, the endless belts or bands B, rake bars or slats C, provided with the teeth D, boxes E, having the slots F, stops I, and braces L, the parts being arranged and combined to operate substantially as specified.

In testimony that I claim the foregoing I have hereunto set my hand this 12th day of April, 1880.

DAVID WM. BOVEE.

Witnesses:
WM. H. PALMER,
S. D. BOVEE.